(12) United States Patent
Pryor

(10) Patent No.: US 6,824,735 B2
(45) Date of Patent: Nov. 30, 2004

(54) GAS CUTTING TORCH

(75) Inventor: David A. Pryor, Denton, TX (US)

(73) Assignee: Victor Equipment Company, Denton, TX (US)

( * ) Notice: Subject to any disclaimer, the term of this patent is extended or adjusted under 35 U.S.C. 154(b) by 33 days.

(21) Appl. No.: 10/367,196

(22) Filed: Feb. 14, 2003

(65) Prior Publication Data

US 2004/0159986 A1 Aug. 19, 2004

(51) Int. Cl.$^7$ ................................................. B23K 7/00
(52) U.S. Cl. ......................................... 266/48; 239/414
(58) Field of Search ............................ 266/48; 239/414

(56) References Cited

U.S. PATENT DOCUMENTS

| | | | |
|---|---|---|---|
| 1,404,011 A | | 1/1922 | Coberly |
| 1,830,459 A | | 11/1931 | Austin et al. |
| 2,008,130 A | | 7/1935 | Damm |
| 2,198,342 A | | 4/1940 | Jacobsson et al. |
| 3,386,665 A | | 6/1968 | Iozzi et al. |
| 3,583,643 A | | 6/1971 | Ollivier et al. |
| 4,022,441 A | | 5/1977 | Turney |
| 4,184,637 A | * | 1/1980 | Mushenko et al. ...... 239/419.3 |
| 4,248,384 A | | 2/1981 | Zwicker |
| D260,846 S | | 9/1981 | Summers et al. |
| 4,409,002 A | | 10/1983 | Zwicker |
| 4,455,176 A | | 6/1984 | Fuhrhop |
| 4,572,483 A | * | 2/1986 | Leu ............................ 266/48 |
| 4,664,621 A | | 5/1987 | Sugisaku et al. |
| D296,863 S | | 7/1988 | Vigneau |
| D326,594 S | | 6/1992 | Haberman |
| 5,120,026 A | | 6/1992 | Bissonnette |
| D343,629 S | | 1/1994 | Bode |
| D346,390 S | | 4/1994 | Sperling et al. |
| D350,884 S | | 9/1994 | Sperling et al. |
| D350,885 S | | 9/1994 | Sperling et al. |
| 5,390,855 A | | 2/1995 | Mims et al. |
| 5,407,348 A | | 4/1995 | Mims et al. |
| 5,507,438 A | | 4/1996 | Thomas et al. |
| 5,772,954 A | * | 6/1998 | Edenfield ..................... 266/48 |

* cited by examiner

Primary Examiner—Scott Kastler
(74) Attorney, Agent, or Firm—Harness, Dickey & Pierce, P.L.C.

(57) ABSTRACT

A gas cutting torch has a body including an oxygen preheat tube having a first longitudinal axis and a fuel gas preheat tube having a second longitudinal axis. A head is connected to the preheat tubes having an oxygen passage communicating with the oxygen preheat tube, a fuel gas passage communicating with the fuel gas preheat tube, and an outlet for the flow of mixed gases from the torch. A mixing chamber in the head communicates with the oxygen passage and fuel gas passage. The torch has an orifice in the oxygen passage through which oxygen is adapted to flow to the mixing chamber at an increased flow velocity with an accompanying pressure drop. The pressure drop assists in the flow of fuel gas into the mixing chamber for mixture with the oxygen. A diffuser in the head defines a diffuser passage having an inlet region for receiving oxygen and fuel gas from the mixing chamber for flow through the diffuser, and an outlet region for the delivery of oxygen and fuel gas to the outlet of the head. The oxygen passage and the diffuser passage are generally co-axial with the first longitudinal axis of the oxygen preheat tube.

18 Claims, 11 Drawing Sheets

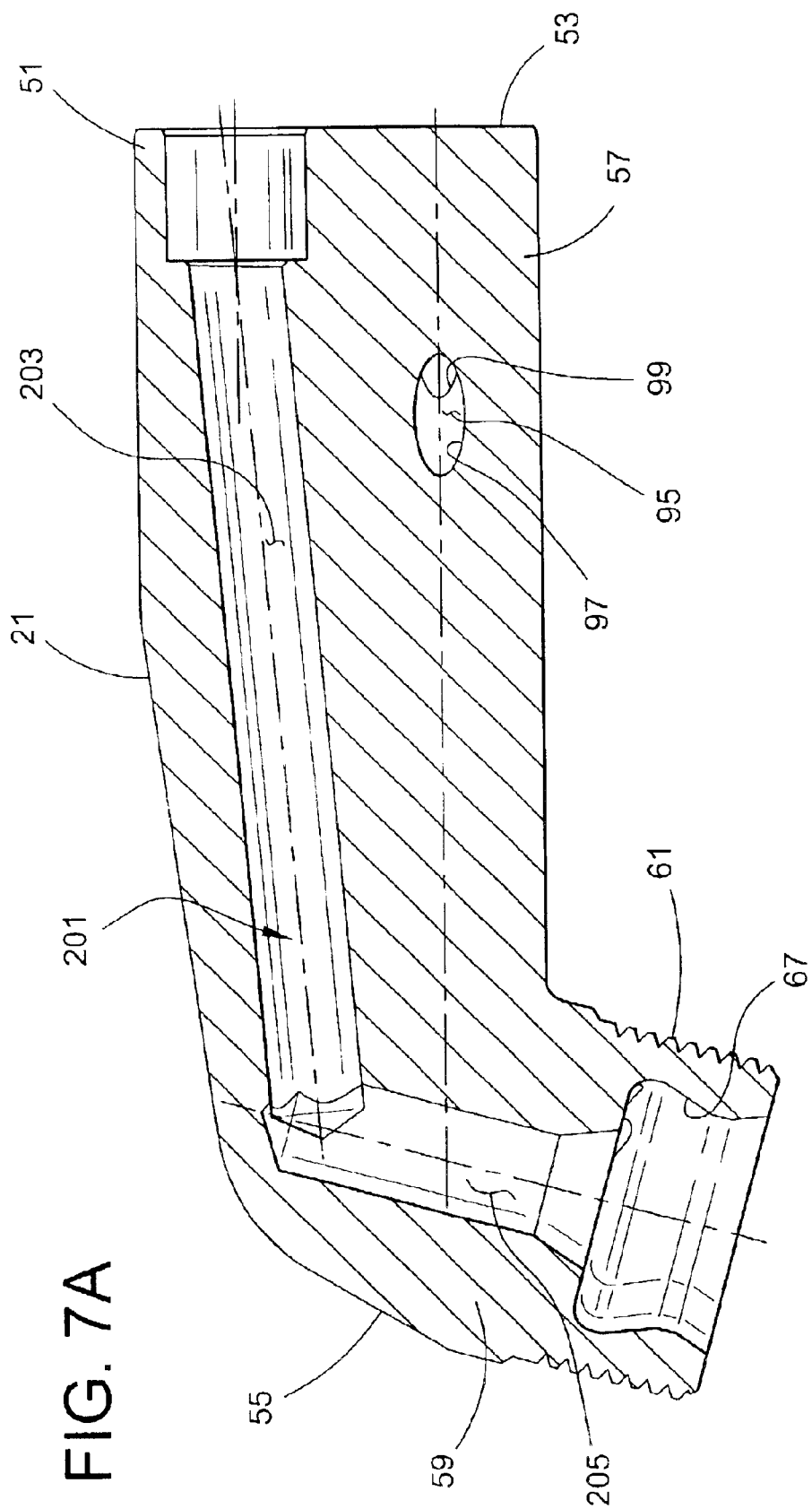

US 6,824,735 B2

GAS CUTTING TORCH

BACKGROUND OF THE INVENTION

The present invention relates generally to a cutting torch, and more particularly to a gas cutting torch having a mixing chamber and a diffuser for mixing preheat oxygen and preheat fuel. A typical cutting torch generates a preheat flame that initially heats a workpiece to a desired kindling temperature and a separate cutting oxygen stream that reacts with the heated ferrous material, and thus, initiates the cutting process. Steel, an exemplary workpiece material, has a kindling temperature of approximately 1800° F. and a melting temperature of approximately 2700° F. The preheat flame is produced from the combustion of a mixture of gaseous fuel (i.e, liquid petroleum, natural gas, or acetylene) and oxygen flowing from the tip of the torch. The cutting stream is generated from a separate flow of cutting oxygen that is discharged from the torch at a relatively higher flow rate than the preheat gas mixture.

Existing cutting torches have mixing apparatus that typically include a removable nozzle mixer and venturi-type diffuser for combining the preheat oxygen and fuel. Current torch designs locate the removable mixer and diffuser in the torch head or in a mixing tube upstream of the torch head. Typically, existing torch designs with a removable mixer and diffuser require either elastomeric seals (e.g., O-rings) or metal-to-metal seals between mating surfaces. Frequently, elastomeric seals fail when exposed to sustained backfires or high heat from prolonged operation of the torch. Metal-to-metal seals require high tolerance fittings that require complex machining and high installation torque making the manufacture, installation, and removal of the torch components more time consuming and costly. Also, in existing designs the mixer and diffuser are angled in the torch head with respect to the gas supply tubes to allow installation and removal of the mixer and diffuser from the head. This angled arrangement typically results in a protrusion on the head that frequently becomes damaged as a result of impact forces received at the protrusion during normal operation. Also, existing torch designs with a head protrusion have increased size and weight that limits an operator's ability to easily and accurately maneuver the cutting torch, particularly in close working spaces.

SUMMARY OF THE INVENTION

Among the several objects of this invention may be noted the provision of a cutting torch which is relatively economical to manufacture; the provision of such a torch which is easy to assemble; the provision of such a torch which reduces maintenance; the provisions of such a torch which allows safe operation; the provision of such a torch which allows operation over an increased range of fuel pressures; the provision of such a torch which has a compact and lightweight torch head; and the provision of such a torch which is easy to maneuver in tight spaces.

In general, a torch of the present invention comprises a body including an oxygen preheat tube having a first longitudinal axis and a fuel gas preheat tube having a second longitudinal axis. A head is connected to the preheat tubes having an oxygen passage communicating with the oxygen preheat tube, a fuel gas passage communicating with the fuel gas preheat tube, and an outlet for the flow of mixed gases from the torch. A mixing chamber in the head communicates with the oxygen passage and fuel gas passage. The torch has an orifice in the oxygen passage through which oxygen is adapted to flow to the mixing chamber at an increased flow velocity with an accompanying pressure drop. The pressure drop assists in the flow of fuel gas into the mixing chamber for mixture with the oxygen. A diffuser in the head defines a diffuser passage having an inlet region for receiving oxygen and fuel gas from the mixing chamber for flow through the diffuser, and an outlet region for the delivery of oxygen and fuel gas to the outlet of the head. The oxygen passage and the diffuser passage are generally co-axial with the first longitudinal axis of the oxygen preheat tube.

In another aspect of the invention, a torch comprises a body including an oxygen preheat tube having a first longitudinal axis and a fuel gas preheat tube having a second longitudinal axis. A head is connected to the preheat tubes having an oxygen passage communicating with the oxygen preheat tube, a fuel gas passage communicating with the fuel gas preheat tube, and an outlet for the flow of mixed gases from the torch. A mixing chamber in the head communicates with the oxygen passage and fuel gas passage. A nozzle member received in the mixing chamber has an orifice through which oxygen is adapted to flow to the mixing chamber at an increased flow velocity with an accompanying pressure drop. The pressure drop assists in the flow of fuel gas into the mixing chamber for mixture with the oxygen. A diffuser in the head defines a diffuser passage having an inlet region for receiving oxygen and fuel gas from the mixing chamber for flow through the diffuser, and an outlet region for the delivery of oxygen and fuel gas to the outlet of the head. The nozzle member and the diffuser are non-removable from the head.

Other objects and features will be in part apparent and in part pointed out hereinafter.

BRIEF DESCRIPTION OF THE DRAWINGS

FIG. 7A is a cross-section taken along the plane including line 7A-7A of FIG. 6 showing a cutting oxygen passageway in the torch head.

Corresponding parts are designated by corresponding reference numbers throughout the drawings.

DESCRIPTION OF THE PREFERRED EMBODIMENT

Figure 1:
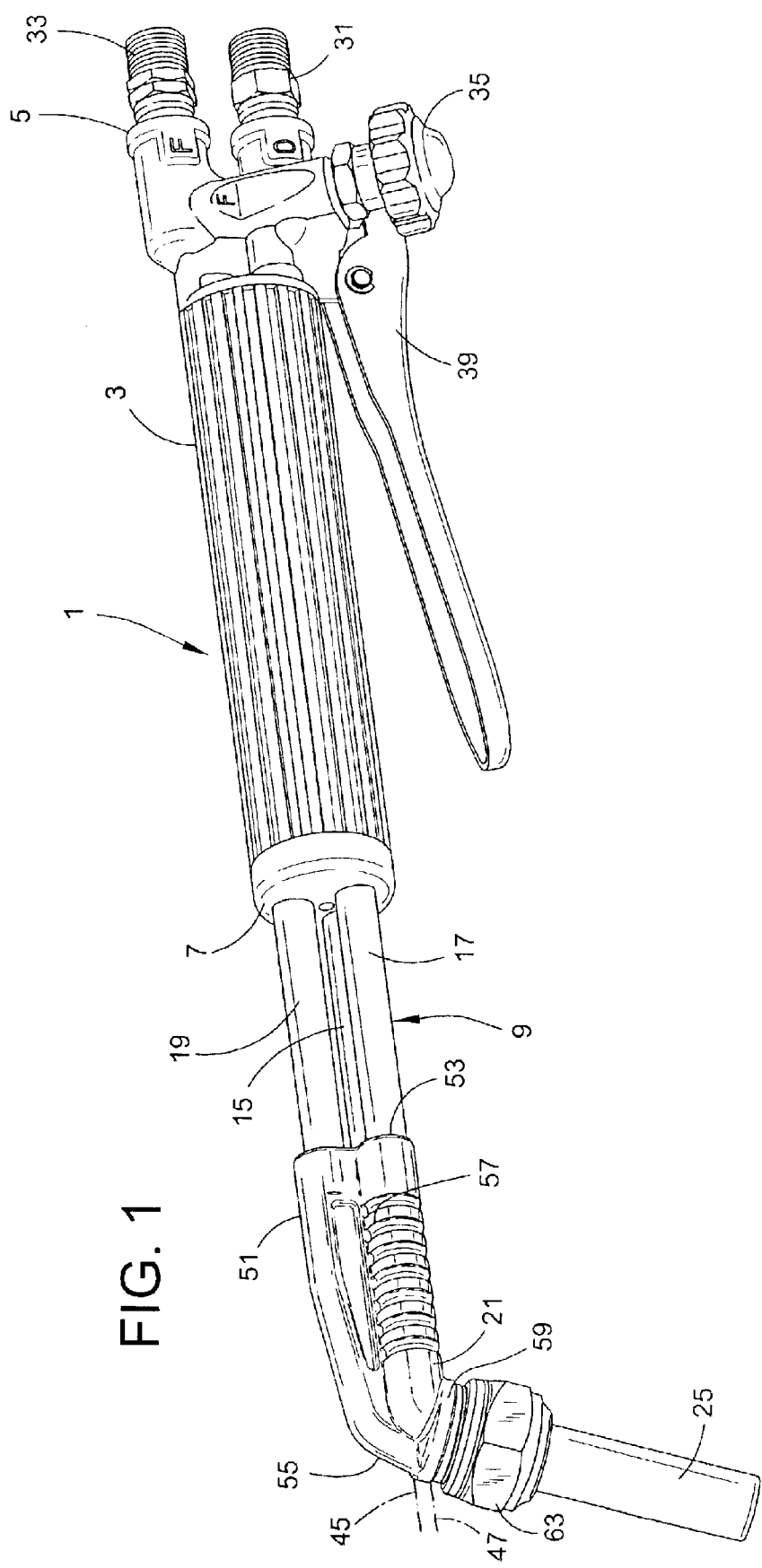
FIG. 1 is a perspective of a gas cutting torch of the present invention.

Referring now to the drawings, and more particularly to FIG. 1, a cutting torch of the present invention is designated in its entirety by the reference numeral 1. The cutting torch 1 has an elongate torch body 3 with a first (back) end 5 and a second (front) end 7, an intermediate section generally designated 9 defined by an oxygen preheat tube 15, a fuel gas preheat tube 17 and a cutting oxygen tube 19 that extend from the body, a head 21 attached to the intermediate section, and a torch tip 25 attached to the head for discharging gas from the cutting torch.

Figure 2:
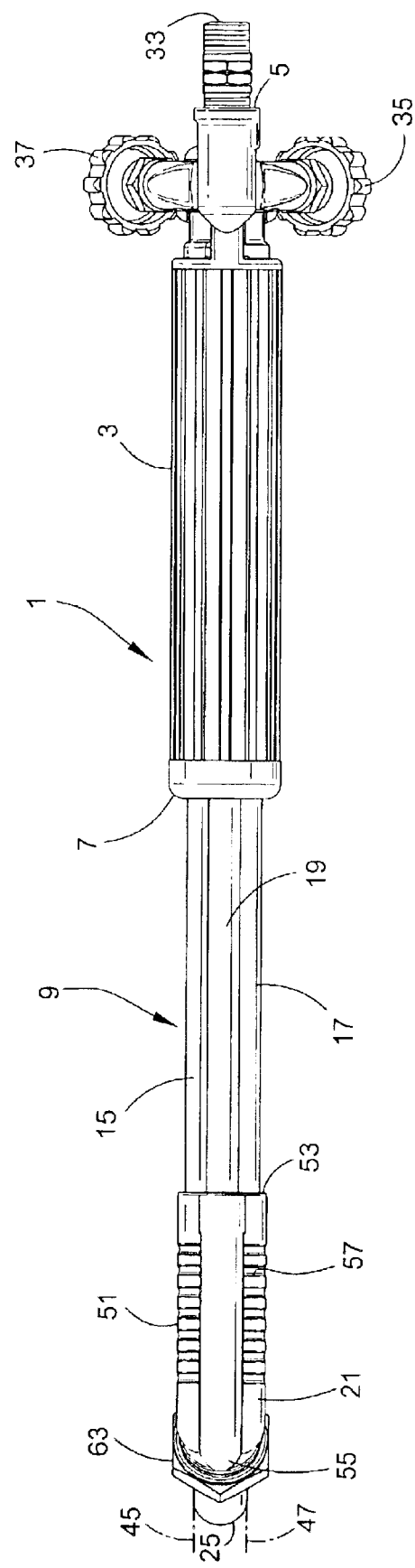
FIG. 2 is a top view of the cutting torch.
Figure 3:
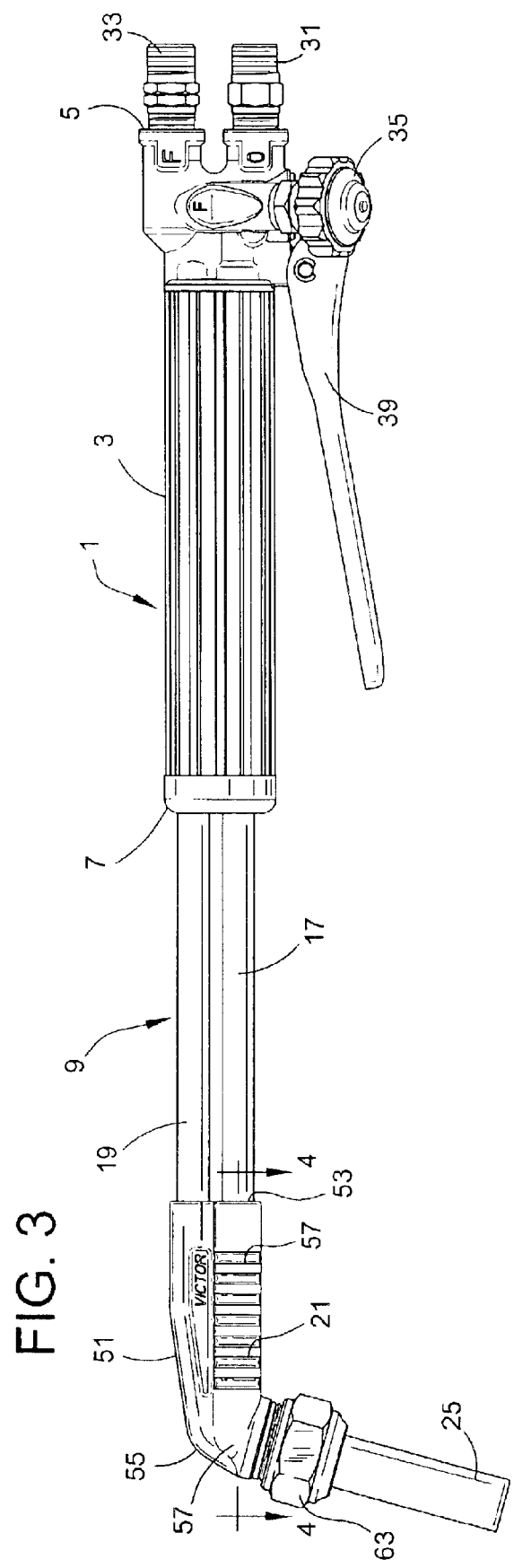
FIG. 3 is a side view of the cutting torch.

In the embodiment shown in FIGS. 1–3, the body 3 is generally cylindric so that the torch 1 can be easily grasped and has an oxygen inlet 31 and fuel inlet 33 at its back end 5 for connection to respective oxygen gas and fuel gas supply hoses (not shown). The design of the body 3 is a conventional design, similar to the design described in U.S. Pat. No. 5,407,348, which is incorporated herein by reference. Oxygen gas from the oxygen inlet 31 is segregated such that respective flows of oxygen are directed through the oxygen preheat tube 15 and cutting oxygen tube 19 affixed to the front end 7 of the body 3. Fuel gas (i.e., liquid petroleum, natural gas, or acetylene) from the fuel inlet 33 passes through the body 3 and is directed through the fuel gas preheat tube 17. A fuel gas flow control valve 35, a preheat oxygen gas flow control valve 37 and a cutting oxygen gas valve 39 are located generally near the back end 5 of the torch body 3 for controlling the flow of preheat fuel, preheat oxygen and cutting oxygen through the torch 1. The oxygen preheat tube 15, fuel gas preheat tube 17, and cutting oxygen tube 19 are fixed by conventional means (i.e., welding, soldering, brazing) at the front end 7 of the torch body 3 to receive respective flows of preheat oxygen, fuel gas and cutting oxygen from the body. In the illustrated embodiment, the oxygen preheat tube 15 and fuel gas preheat tube 17 are generally parallel and spaced below the cutting oxygen tube 19 to define the intermediate section 9 of the torch 1, the oxygen preheat tube having a first longitudinal axis 45 and the fuel gas preheat tube having a second longitudinal axis 47.

The head 21 is fixedly attached to the oxygen preheat tube 15, fuel gas preheat tube 17 and cutting oxygen tube 19 by permanent attachment means (i.e., welding, soldering, brazing, etc.). A shown in FIGS. 3–7, the head 21 comprises a generally solid, elongate body 51 with a first (rear) end 53, a second (forward) end 55, a main section 57 axially aligned with the intermediate section 9 of the torch 1, and a turned down outlet section 59 having external threads 61 for receiving a threaded tip nut 63. In the illustrated embodiments, solder rings 64 and 65 are provided at the rear end 53 of the head 21 to create a soldered connection holding the oxygen preheat tube 15 and fuel gas preheat tube 17 in the head. The outlet section 59 has a central bore 67 for receiving the tip 25 and allowing for gases to pass from the torch head 21 to the tip. In the embodiments of FIGS. 1–8, the outlet section 59 of the head 21 is angled approximately 75 degrees with respect to the main section 57 of the head. It will be understood that the torch head 21 could have an outlet section 59 disposed at various angles including 90 degrees or practically any other desired angle without departing from the scope of this invention.

Figure 4:
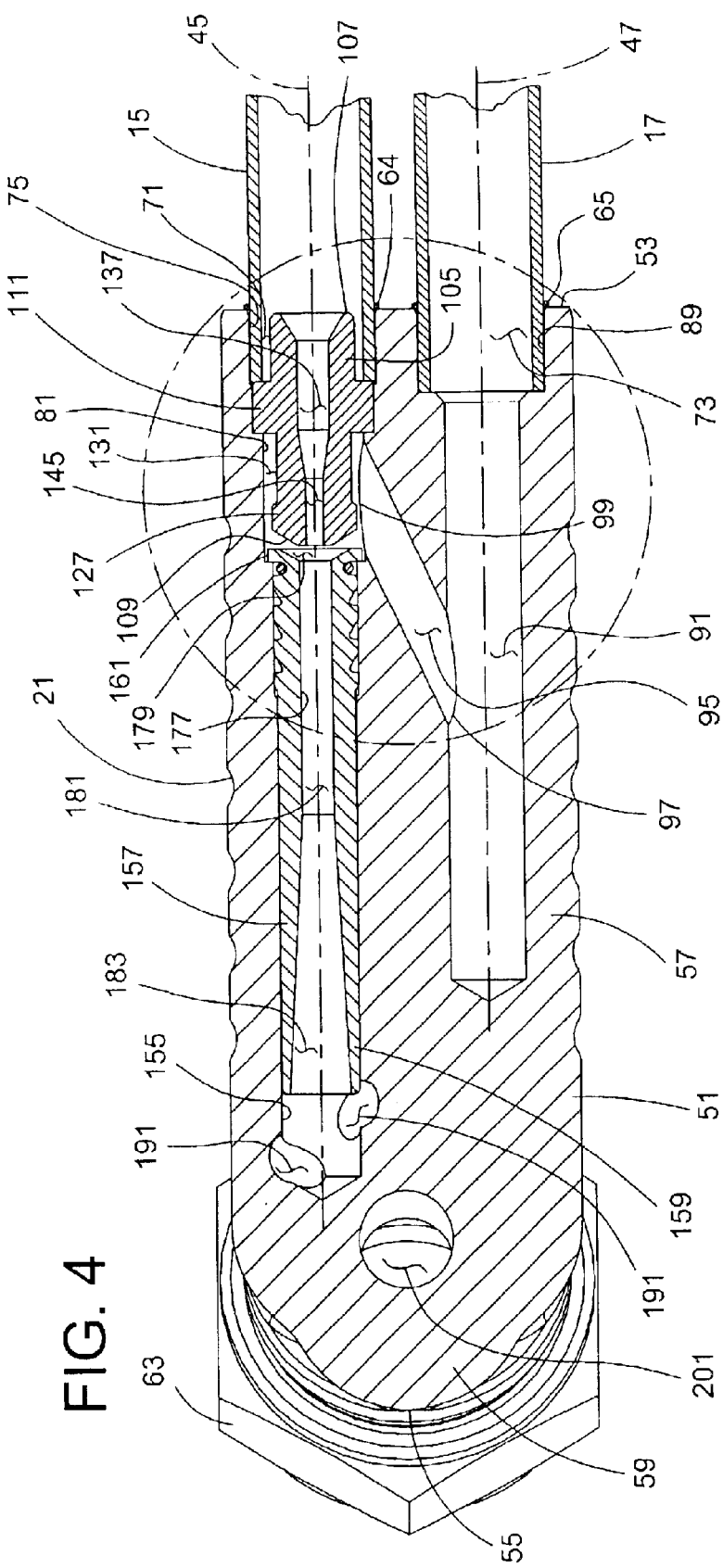
FIG. 4 is a cross-section taken along the plane including line 4-4 of FIG. 3 showing a head of the cutting torch.
Figure 5:
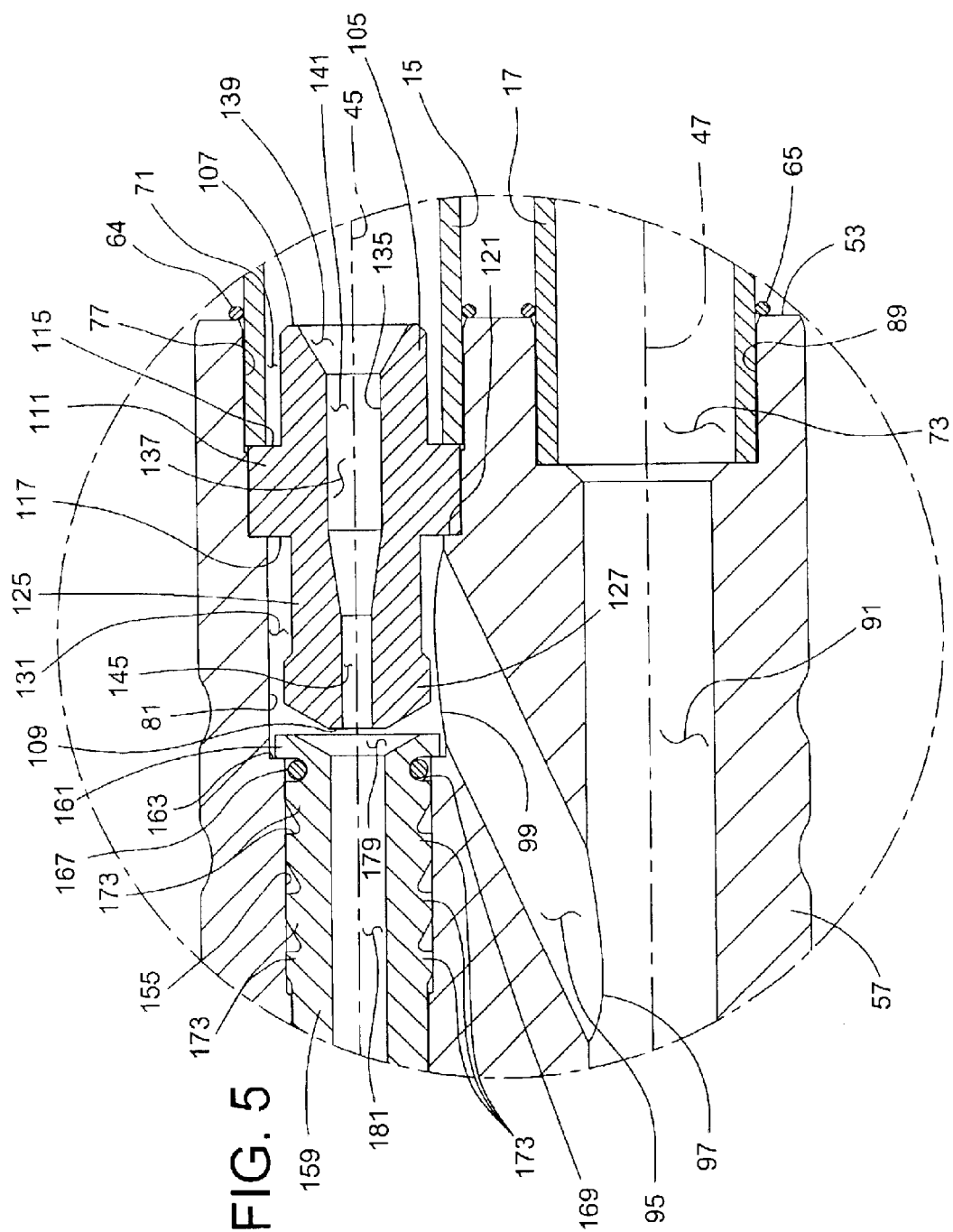
FIG. 5 is an enlarged portion of FIG. 4.
Figure 6:
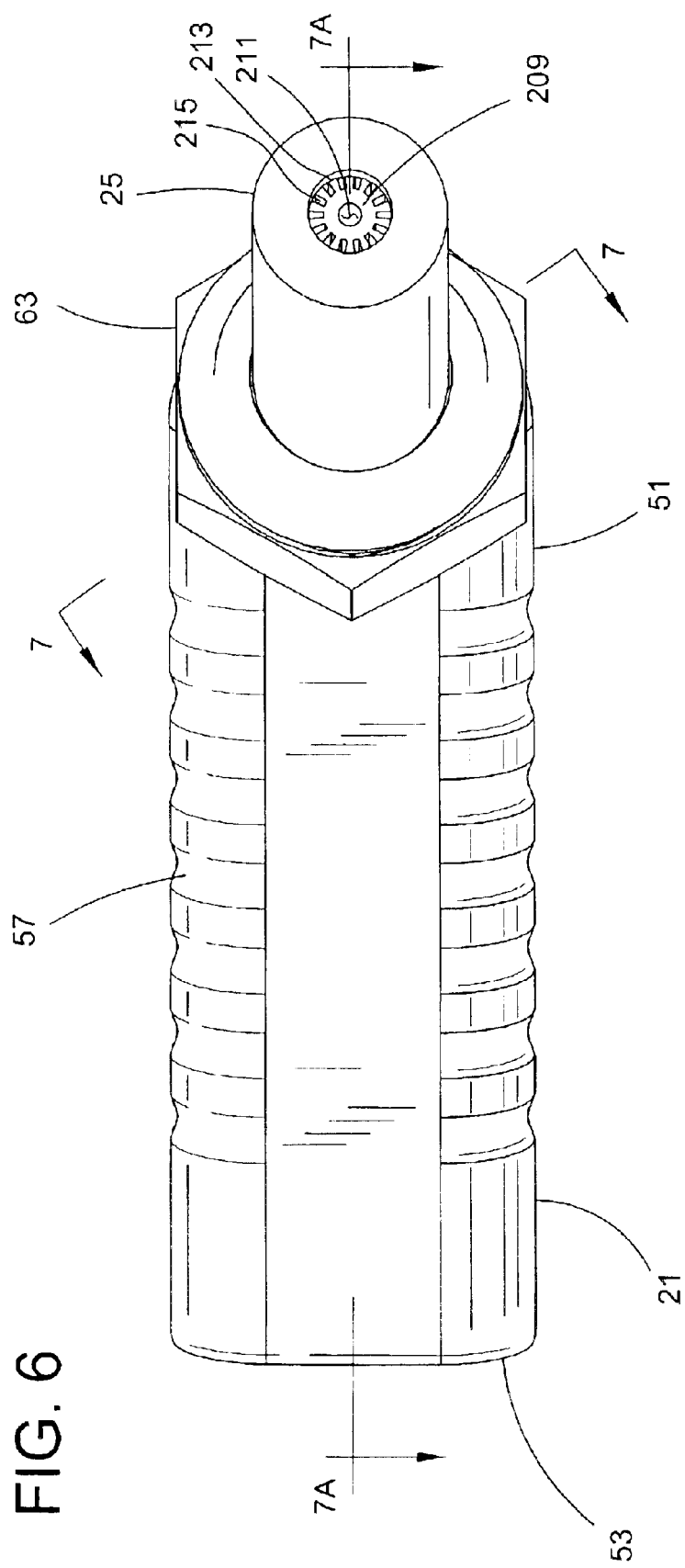
FIG. 6 is a bottom view of the torch showing the torch head and a torch tip.

The head 21 has distinct flow paths for cutting oxygen and mixed preheat oxygen and fuel so that separate flows of mixed preheat gases and cutting oxygen are conveyed to the outlet bore 67. As shown in FIG. 4, the main section 57 of the torch head 21 has a oxygen passage, generally designated 71, axially aligned with longitudinal axis 45 of the oxygen preheat tube 15 and a fuel gas passage, generally designated 73 axially aligned with the longitudinal axis 47 of the fuel gas preheat tube 17. As shown in FIGS. 4 and 5, the oxygen passage 71 is generally a stepped cylindrical bore 75 toward the rear end 53 of the head 21 having an inlet section 77 sized to receive the oxygen preheat tube 15 and a downstream section of reduced diameter that forms a mixing chamber 81 in the torch head 21. The inlet section 77 and the mixing chamber 81 of the oxygen passage 71 are axially aligned with the oxygen preheat tube 15 to readily receive preheat oxygen from the tube. The fuel gas passage 73 is a generally cylindrical bore toward the rear end 53 of the head 21 that is laterally spaced away from the mixing chamber 81 and axially aligned with the fuel gas preheat tube 17 to define a separate flow path for fuel gas. The fuel gas passage 73 has an inlet bore 89 generally parallel to the oxygen passage 71 in the head 21 sized to receive the fuel gas preheat tube 17 and a reduced diameter main supply passage 91 axially aligned with the inlet bore and extending into the head. A cross-connect passageway 95 in the head 21 has a first upstream end 97 opening from the main supply passage 91 and a second downstream end 99 opening into the mixing chamber 81 to enable the flow of fuel gas from the main supply passage to the mixing chamber. In the illustrated embodiment, the first upstream end 97 of the passageway 95 is closer to the outlet section 59 of the head 21 than to the second downstream end 99 allowing the flow of gas in a generally transverse direction with respect to the first and second longitudinal axes 45 and 47. It will be understood that the upstream end 97 of the cross-connect passageway 95 could be farther from the outlet section 59 of the head 21 than the downstream end 99 of the passageway or that the cross-connect passageway could be generally perpendicular to the first and second longitudinal axes 45 and 47.

In the illustrated embodiment, a generally cylindric nozzle member 105 having an upstream end 107 and a downstream end 109 is axially aligned with the oxygen passage 71 and fixed to the torch head 21 and to the oxygen preheat tube 15 by non-removable attachment means such as soldering, brazing or the like. As shown in FIGS. 4 and 5, the nozzle member 105 has an external shoulder 11 spaced in from the upstream end 107 of the nozzle. The shoulder 111 has an upstream face 115 that abuts against the oxygen preheat tube 15 and a downstream face 117 that abuts an internal shoulder 121 formed in the oxygen passage 71 such that the flow of gas between the external and internal shoulders is prevented. In the illustrated embodiment, the nozzle member 105 is held in place in the head 21 by contact against the internal shoulder 121 on one side of the nozzle shoulder 111 and contact against the oxygen preheat tube 15 on the other side of the nozzle shoulder. As shown in FIGS. 4 and 5, solder from the solder ring 64 fills the small clearance between the preheat oxygen supply tube 15 and the head 21 to form a permanent soldered connection holding the tube against the nozzle shoulder 111 in the head. The nozzle member 105 has an intermediate section 125 and a forward end section 127 downstream from the shoulder 111, both such sections being spaced from the wall defining the mixing chamber 81 to create an annular cavity 131 around the nozzle member which communicates with the cross-connect passageway 95 leading from the fuel gas main supply passage 91. The intermediate section 125 of the nozzle member 105 has an outside diameter somewhat less than the forward end section 127 of the nozzle member, so that the annular cavity 131 converges in a downstream direction. The convergence of the annular cavity 131 near the forward end section 127 of the nozzle member 105 provides a slight resistance to the flow of fuel gas from the cavity so that fuel gas entering the cavity from the cross-connect passageway 95 is uniformly distributed around the nozzle member.

The nozzle member 105 has a centrally disposed bore 135 defining an internal passageway 137 having sections of decreasing diameter from the upstream end 107 to the downstream end 109 of the nozzle. The internal passageway 137 has a truncated conical inlet 139 at the upstream end 107 leading to an intermediate portion 141 of uniform diameter. The intermediate portion 141 leads to an orifice passageway 145 of reduced diameter that defines the outlet of the nozzle 105. The flow of oxygen through the reduced cross-section of the orifice 145 causes the pressure of the oxygen gas exiting the nozzle member 105 to drop below the gas pressure of the fuel in the surrounding cavity 131. Preferably, the discharge pressure of the oxygen gas from the nozzle member 105 will be below atmospheric pressure so that an internal vacuum is created to aspirate the fuel gas from the cavity 131 around the forward end 127 of the nozzle and into the flow stream of the oxygen exiting the nozzle. It will be understood that the present invention can supply mixed preheat fuel and oxygen when the preheat fuel is supplied at relatively low gas pressures (i.e., up to approximately 2 psig) or when the preheat fuel is supplied at higher gas pressures (i.e., greater than about 2 psig).

As shown in FIGS. 4 and 5, a diffuser bore 155 located in the head 21 and axially aligned with and adjacent the mixing chamber 81 houses a diffuser 157 that receives preheat fuel and oxygen from the mixing chamber. The diffuser 157 comprises a generally elongate tubular body 159 having an inlet flange 161 that protrudes into the mixing chamber 81 and is secured against an internal shoulder 161 in the head 21 defining the downstream end of the mixing chamber. In the embodiment of FIGS. 4 and 5, the diffuser 157 is press-fit into the diffuser bore 155 and held in place by a solder connection between the flange 161 and the torch head 21. In the illustrated embodiment, a solder ring 167 is received in an external groove 169 in the diffuser body 159 adjacent the flange 161 to facilitate the permanent connection of the diffuser 157 to the head 21. It will be understood that other means of permanent attachment could be used to affix the diffuser 21 to the head 21 such that the flow of gas between the flange 161 and the head is prevented. As shown in FIG. 5, the diffuser body 159 also has a plurality of external radial ribs 173 adjacent the solder ring 167 that are press-fit against the surface of the diffuser bore 155 to help secure the diffuser 157 in the head 21. The diffuser 157 has an internal passageway 177 which is preferably axially aligned with the internal bore 135 of the nozzle member 105 for receiving oxygen from the nozzle member and preheat fuel from the external cavity 131. In the illustrated embodiment, the diffuser passageway 177 has a short inlet region 179 of decreasing diameter, a mixing region 181 of generally uniform diameter, and an outlet region 183 of gradually increasing diameter. The large initial diameter of the inlet region 179 allows the diffuser 157 to readily receive fuel gas and preheat oxygen from the mixing chamber 81. In the illustrated embodiment, the nozzle member 105 is axially aligned with the diffuser 157 such that the flow of oxygen exiting the orifice 145 and passing into the diffuser creates a zone of low pressure that causes the preheat fuel from the external cavity 131 surrounding the nozzle member to flow into the inlet region 179 of the diffuser. As shown in FIG. 4, the mixing region 181 and the outlet region 183 have roughly the same overall length, and the inlet region 179 is substantially shorter. It will be understood that the diffuser body 159 could have other sizes and shapes and that the inlet region 179, mixing region 181, and outlet region 183 of the diffuser 157 could have various diameters and lengths. In the illustrated embodiment, two preheat passageways 191 communicate with the diffuser bore 155 downstream of the diffuser 157 to direct the mixture of preheat fuel and oxygen from the outlet region 183 of the diffuser. These preheat passageways 191 (only one of which is shown in FIG. 7) lead to the outlet bore 67 of the head 21 and are configured so that the preheat mixture is radially distributed around the periphery of the outlet bore to allow the preheat mixture to flow in into the tip 25.

By way of example but not limitation, the diffuser body 159 can have an overall length of approximately 1.65 inches and an outer diameter of approximately 0.25 inches. The internal passageway 177 of the diffuser can have an initial diameter of approximately 0.22 inches at the upstream end of the inlet region 179, a diameter of approximately 0.10 inches in the mixing region 181, and a diameter of approximately 0.18 inches at the downstream end of the outlet region 183. In one embodiment, the nozzle member 105 has an overall length of approximately 0.70 inches with an outer diameter of approximately 0.37 inches at the shoulder 111. The internal passageway 137 of the nozzle member 105 can have an initial diameter of approximately 0.20 inches at the inlet 139, a diameter of approximately 0.09 inches at the intermediate portion 141, and a diameter of approximately 0.052 inches at the orifice 145 defining the outlet of the nozzle member.

Figure 7:
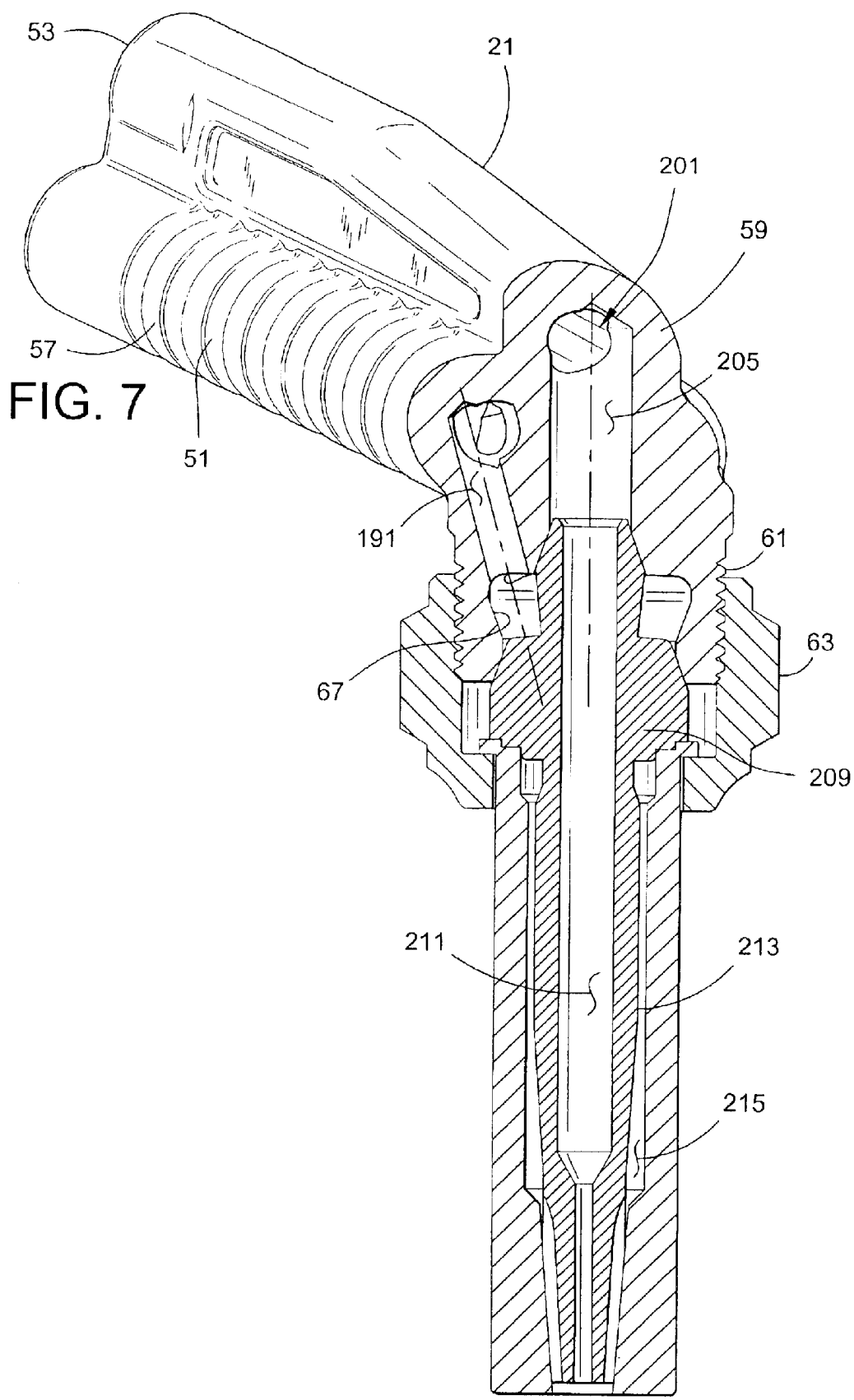
FIG. 7 is a cross-section taken along the plane including line 7-7 of FIG. 6 showing an outlet of the torch head.

As shown in FIGS. 7 and 7A, the head also has a cutting oxygen passage, generally designated 201, to allow an isolated flow of cutting oxygen through the head 21. This passageway 201 includes a first inlet section 203 spaced above the oxygen passage 71 and fuel gas passage 73 and an outlet section 205 that is axially aligned with the central bore 67 in the outlet section 59 of the head 21. The outlet section 205 of the passage 201 allows cutting oxygen to be distributed generally axially with the tip 25 inserted in the head 21. As shown in FIG. 7, the tip 25 has a tip insert 209 received in the outlet bore 67 of the head 21 that provides a central flow path 211 through the tip for the discharge of cutting oxygen from the torch 1. The tip insert 209 defines the central flow path 211 for cutting oxygen and has an outer surface 213 spaced in from the tip 25 to provide an annular flow path 215 between the tip and the insert that receives mixed preheat gases from the preheat passageways 191.

Figure 8:
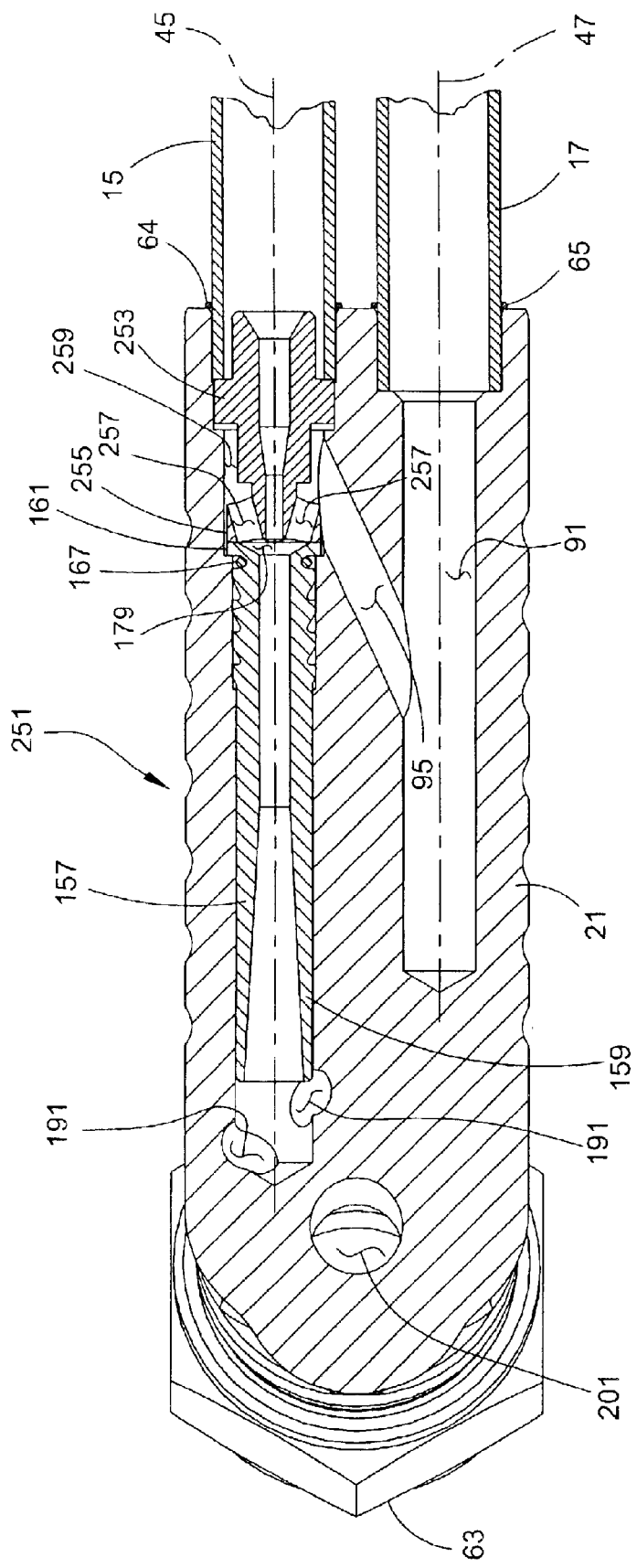
FIG. 8 is a top section showing a torch head of a second embodiment of the present invention.

FIG. 8 illustrates the torch head of a second embodiment of the present invention, generally designated 251. This embodiment 251 is substantially similar to the first embodiment 1 except a modified nozzle member 253 is provided in the torch head 21. The nozzle member 253 is affixed in the head 21 in a similar fashion as in the previous embodiment except the nozzle member shown in FIG. 8 has an enlarged forward end 255 which contacts the inlet flange 161 of the diffuser 157. The nozzle member 253 is secured against the diffuser 157 and soldered, brazed or otherwise suitably non-removably connected to the oxygen preheat tube 15 and the head 21 so that diffuser is held in place by the solder ring 167 and the secure attachment of the nozzle member 253 in the torch head. The enlarged forward end 255 of the nozzle member 253 is formed with passages 257 that permit the flow of fuel gas from the cavity 259 around the nozzle into the inlet section 179 of the diffuser 157.

In operation, the oxygen inlet 31 and the fuel gas inlet 33 on the torch body 3 are connected to upstream gas supply hoses (not shown) to supply fuel gas and oxygen gas to the torch 1. Typically, oxygen gas is supplied at a higher pressure than the fuel gas but it will be understood that this invention could operate over a variety of fuel gas pressures including those in which the fuel gas supply pressure is equal to or greater than the oxygen gas supply pressure. The flow of fuel and preheat oxygen into the torch 1 is throttled by adjustment of the fuel gas flow control valve 35 and the preheat oxygen flow control valve 37. Preheat fuel passing through the fuel gas flow control valve 35 flows through the body 3, the fuel gas preheat tube 17, the fuel gas passage 73 in the torch head 21 and through the cross-connect passageway 95 to fill the external cavity 131 around the nozzle member 105 in the mixing chamber 81. Preheat oxygen flows from the preheat oxygen flow control valve 37 through the body 3, the oxygen preheat tube 15, the oxygen passage 71 in the torch head 21, the internal passageway 137 of the nozzle member 105, and through the orifice 145 at the outlet of the nozzle member. The flow of preheat oxygen through the reduced diameter orifice 145 in the nozzle member 105 causes a pressure drop in the stream of flowing oxygen such that the oxygen gas pressure at the outlet of the nozzle member 105 is lower than the gas pressure of the fuel gas in the cavity 131 surrounding the nozzle member. The low pressure stream of preheat oxygen exiting the orifice 145 flows into the inlet region 179 of the diffuser 157 aspirating the comparatively higher pressure fuel gas from the external cavity 131. Preheat oxygen and fuel gas pass from the inlet region 179 into the mixing region 181 of the diffuser 157 where further mixing of the gases occurs so that the flow of mixed preheat gases becomes less turbulent and more laminar. The mixture of fuel and oxygen flows into the outlet region 183 of the diffuser 157 where the increasing diameter of the diffuser body 159 allows for further mixing of gases and a reduction in flow velocity with an accompanying increase in gas pressure of the mixture. The increase in gas pressure of the mixture allows the mixture of fuel and oxygen to exit the diffuser 157 with sufficient gas pressure to allow for a sustained flow of preheat gases though the preheat passageways 191 leading to the outlet bore 67 of the head and through the annular flow path 215 between the tip insert 209 and the tip 25. The mixed preheat gas flow exiting the tip 25 is ignited to create the preheat flame that is used to initially heat the workpiece to the desired kindling temperature.

After the workpiece has been sufficiently heated, the cutting oxygen valve 39 is actuated so that the higher pressure flow of cutting oxygen is supplied to the torch 1. The cutting oxygen flows through the body 3, the cutting oxygen tube 19, and the cutting oxygen passageway 201 in the torch head 21 leading to the outlet bore 205 where the flow of cutting oxygen from the torch head is axially aligned with the torch tip 25 such that the cutting oxygen flows through the centrally disposed passageway 211 in the tip insert 209. The cutting oxygen gas exiting the tip 25 is directed to the workpiece to initiate the reaction with the ferrous material that produces the cutting of the workpiece.

Figure 9:
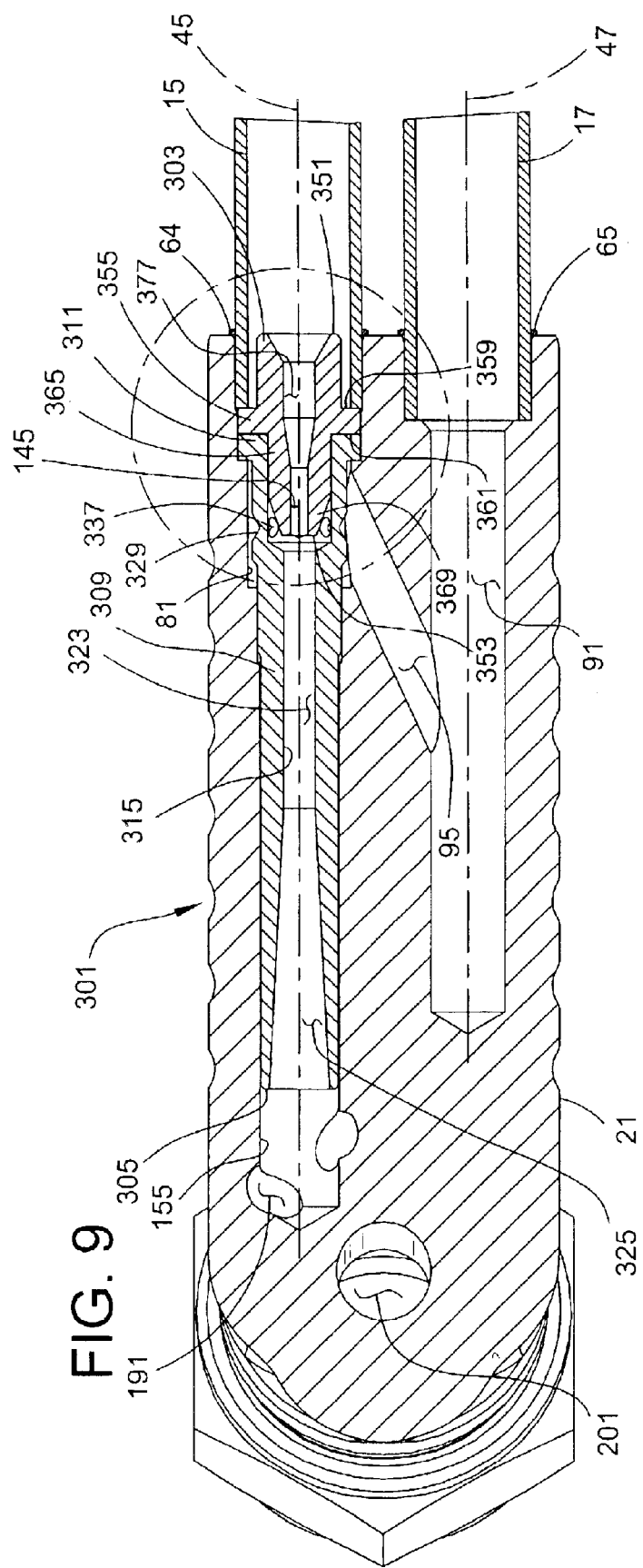
FIG. 9 is a top section showing a torch head of a third embodiment of the present invention.
Figure 10:
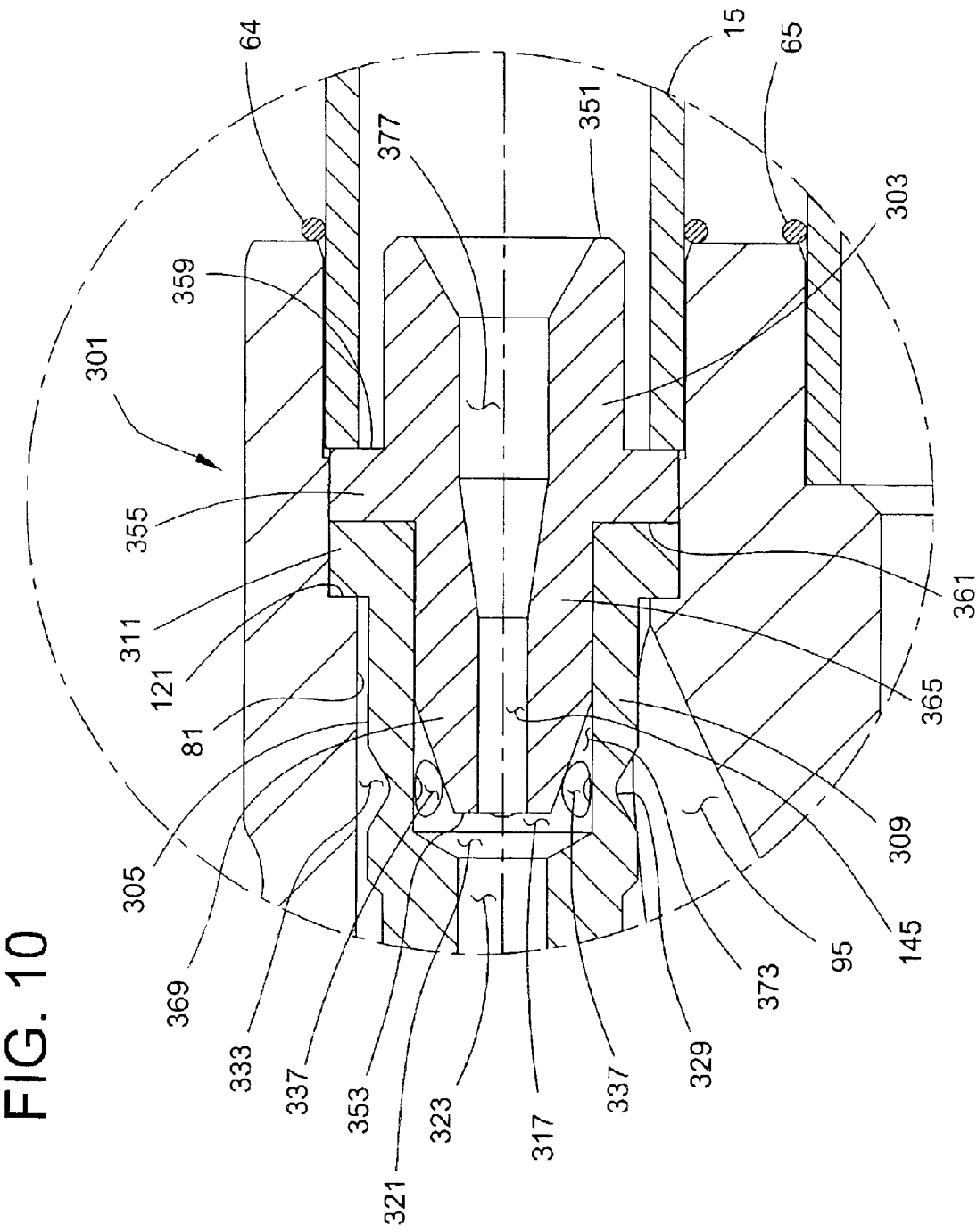
FIG. 10 is an enlarged portion of FIG. 9.

FIGS. 9 and 10 illustrate the torch head of a third embodiment of the present invention, generally designated 301. This embodiment 301 is substantially similar to the first embodiment 1 except a modified nozzle member 303 and a modified diffuser member 305 are provided for permanent attachment to the head 21 without the need for the internal solder ring 167 of the previous embodiments. As shown in FIGS. 9 and 10, the diffuser member 305 comprises a generally elongate tubular body 309 with an inlet flange 311 that protrudes into the oxygen passage 71 and is secured against the internal shoulder 121 of the head 21. The diffuser 305 has an internal passageway 315 having an inlet region 317 at the upstream end of the diffuser, an intermediate region 321 of reduced diameter, a mixing region 323 of generally uniform diameter, and an outlet region 325 of gradually increasing diameter. The diffuser 305 has an external annular groove 329 downstream of the inlet flange 311 and spaced in from the wall defining the mixing chamber 81 to form an annular cavity 333 around the diffuser body 309 that communicates with the cross-connect passageway 95 leading from the fuel gas main supply passage 91. The groove 329 has passages 337 circumferentially spaced in the groove to permit the flow of fuel gas from the annular cavity 333 into the inlet region 317 of the internal passageway 315 of the diffuser 305.

As seen in FIGS. 9 and 10, the nozzle member 303 is generally cylindric and has an upstream end 351 and a downstream end 353 that is received in the inlet region 317 of the internal passageway 315 of the diffuser 305. An external shoulder 355 is spaced in from the upstream end 351 of the nozzle 303 and has an upstream face 359 that abuts against the oxygen preheat tube 15 and a downstream face 361 that abuts against the inlet flange 311 of the diffuser 305. The nozzle member 303 is pressed against the diffuser 305 and held in place by the solder connection that permanently affixes the oxygen preheat tube 15 in the head 21. The engagement of the nozzle shoulder 355 with the diffuser inlet flange 311 on one end and the oxygen preheat tube 15 at the other end allows for a secure connection of the diffuser 305 in the head 21 without the need for the internal solder ring 167 of the previous embodiments. The nozzle member 303 has an intermediate section 365 of uniform diameter and a forward end section 369 of decreasing diameter that are both received in the inlet region 317 of the diffuser passageway 315. The decreasing diameter of the forward end section 369 of the nozzle member 303 creates an annular space 373 in the inlet region 317 of the diffuser passageway 315 around the nozzle member at a location generally corresponding to the passages 337 of the diffuser 305. The nozzle member 303 has an internal passageway 377 substantially similar to the passageway 137 of the previous embodiment, and the flow of oxygen through the reduced cross-section of the orifice 145 causes the pressure of the oxygen gas exiting the nozzle member 303 to drop below the gas pressure of the fuel in the annular space 373 around the exterior of the nozzle member. The discharge pressure of the oxygen gas exiting the nozzle member 303 creates an internal vacuum to aspirate the fuel gas from the annular space 337 around the forward end section 369 of the nozzle and into the flow stream of the oxygen exiting the nozzle. As in the previous embodiments, the mixture of preheat oxygen and fuel flows through the diffuser passage 315 where further mixing takes place and the flow velocity is reduced.

In view of the above, it will be seen that the several objects of the invention are achieved and other advantageous results attained. For example, the configuration of the present invention allows for a compact head 21 with a comparatively low profile so that the torch 1 can be easily maneuvered in tight spaces. Also, the permanent (non-removable) attachment of the nozzle member 105 and the diffuser 157 in the torch 1 avoids the use of threaded connections, which eliminates the need for metal-to-metal seals that require high manufacturing tolerances and high torque assembly or resilient O-rings that are prone to leakage and melting. Further, the present design allows for operation of the torch 1 over a range of fuel gas pressures including typical low or high fuel gas supply pressures used for cutting operations.

As various changes could be made in the above constructions without departing from the scope of the invention, it is intended that all matter contained in the above description or shown in the accompanying drawings shall be interpreted as illustrative and not in a limiting sense. For example, the diffuser body 159 and nozzle member 105 can have alternative configurations as shown in FIGS. 8 and 9 or may have other shapes and sizes without departing from the scope of this invention. The fuel gas passage 73 in the torch head can have other configurations including those which allow for direct flow of fuel gas from the fuel gas preheat tube 17 to the annular cavity 131 surrounding the nozzle 105 thus eliminating the need for a distinct cross-connect passageway 95. It is also envisioned that the nozzle member 105 and the diffuser 157 could be one integral piece that is secured in the torch head 21 to receive both preheat fuel gas and preheat oxygen gas. Also, the nozzle member 105 and/or the diffuser 157 could be machined into the oxygen passage 71, the mixing chamber 81, and/or the diffuser bore 155 in the torch head 21 to form an integral part of the head that is axially aligned with the oxygen preheat tube 15. The tip insert 209 may be integral with the tip 25 to form the an axial flow path for cutting oxygen having segregated flow paths for mixed preheat fuel and oxygen. The tip 25 may have other flow configurations for accommodating the flow of preheat gases and cutting oxygen from the torch.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

What is claimed is:

1. A torch comprising
   a body including an oxygen preheat tube having a first longitudinal axis and a fuel gas preheat tube having a second longitudinal axis,
   a head connected to said preheat tubes, said head having an oxygen passage communicating with said oxygen preheat tube, a fuel gas passage communicating with said fuel gas preheat tube, and an outlet for flow of mixed gases from the torch,
   a mixing chamber in the head communicating with the oxygen passage and fuel gas passage,
   an orifice in the oxygen passage through which oxygen is adapted to flow to the mixing chamber at an increased flow velocity with an accompanying pressure drop, said pressure drop assisting in the flow of fuel gas into the mixing chamber for mixture with the oxygen, and
   a diffuser in the head defining a diffuser passage having an inlet region for receiving oxygen and fuel gas from the mixing chamber for flow through the diffuser, and an outlet region for the delivery of oxygen and fuel gas to the outlet of the head,
   said oxygen passage and said diffuser passage being generally co-axial with said first longitudinal axis of the oxygen preheat tube,
   wherein said diffuser is non-removable from the head.

2. A torch as set forth in claim 1 wherein said diffuser is press fit into the diffuser passage and attached to the head by a soldered connection with the head.

3. A torch as set forth in claim 1 wherein said outlet region of said diffuser has an increasing flow area in a downstream direction for decreasing the flow velocity of the gases with an accompanying increase in pressure prior to delivery of the gases to the outlet of the torch.

4. A torch as set forth in claim 3 wherein said inlet region of said diffuser has a decreasing flow area in a downstream direction for increasing the flow velocity of the gases entering the diffuser from the mixing chamber.

5. A torch as set forth in claim 4 wherein said diffuser further comprises a mixing region generally located between the inlet and outlet regions, said mixing region having a substantially uniform flow area for the mixing of the gases.

6. A torch comprising
   a body including an oxygen preheat tube having a first longitudinal axis and a fuel gas preheat tube having a second longitudinal axis,
   a head connected to said preheat tubes, said head having an oxygen passage communicating with said oxygen preheat tube, a fuel gas passage communicating with said fuel gas preheat tube, and an outlet for flow of mixed gases from the torch,
   a mixing chamber in the head communicating with the oxygen passage and fuel gas passage,
   an orifice in the oxygen passage through which oxygen is adapted to flow to the mixing chamber at an increased flow velocity with an accompanying pressure drop, said pressure drop assisting in the flow of fuel gas into the mixing chamber for mixture with the oxygen,
   a nozzle member in the oxygen passage defining said orifice, said nozzle member is non-removable from the head, and
   a diffuser in the head defining a diffuser passage having an inlet region for receiving oxygen and fuel gas from the mixing chamber for flow through the diffuser, and an outlet region for the delivery of oxygen and fuel gas to the outlet of the head,
   said oxygen passage and said diffuser passage being generally co-axial with said first longitudinal axis of the oxygen preheat tube.

7. A torch as set forth in claim 6 wherein said nozzle member is attached to the head by a soldered connection with the head.

8. A torch as set forth in claim 6 wherein said nozzle member comprises a body having an upstream end in contact with the oxygen preheat tube and a downstream end located in the mixing chamber.

9. A torch as set forth in claim 8 wherein said nozzle member body has an inlet at its upstream end for receiving oxygen gas from the oxygen preheat tube and an outlet at its downstream end comprising said orifice.

10. A torch as set forth in claim 9 wherein said mixing chamber comprises an annular space between the nozzle member body and a wall defining the mixing chamber for receiving fuel gas from said fuel gas passageway.

11. A torch as set forth in claim 6 wherein said nozzle member is received in said diffuser passage.

12. A torch as set forth in claim 11 wherein said mixing chamber comprises an annular space between the diffuser and a wall defining the mixing chamber for receiving fuel gas from said fuel gas passageway.

13. A torch comprising
    a body including an oxygen preheat tube having a first longitudinal axis and a fuel gas preheat tube having a second longitudinal axis,
    a head connected to said preheat tubes, said head having an oxygen passage communicating with said oxygen preheat tube, a fuel gas passage communicating with said fuel gas preheat tube, and an outlet for flow of mixed gases from the torch,
    a mixing chamber in the head communicating with the oxygen passage and fuel gas passage,
    a nozzle member received in the mixing chamber having an orifice through which oxygen is adapted to flow to the mixing chamber at an increased flow velocity with an accompanying pressure drop, said pressure drop assisting in the flow of fuel gas into the mixing chamber for mixture with the oxygen, and a diffuser in the head defining a diffuser passage having an inlet region for receiving oxygen and fuel gas from the mixing chamber for flow through the diffuser, and an outlet region for the delivery of oxygen and fuel gas to the outlet of the head, said nozzle member and said diffuser being non-removable from the head.

14. A torch as set forth in claim 13 wherein said diffuser is press fit into the diffuser passage and attached to the head by a soldered connection with the head.

15. A torch as set forth in claim 14 wherein said nozzle member is attached to the head by a soldered connection with the head.

16. A torch comprising:

a body including an oxygen preheat tube and a fuel gas preheat tube;

a head connected to said oxygen preheat tube, said head having an oxygen passage communicating with said oxygen preheat tube, a fuel gas passage communicating with said fuel gas preheat tube, and an outlet;

a mixing chamber communicating with the oxygen passage and fuel gas passage;

a nozzle member received in the mixing chamber having an orifice through which oxygen is adapted to flow to the mixing chamber at an increased flow velocity; and a diffuser in the head for receiving oxygen and fuel gas from the mixing chamber and delivering oxygen and fuel gas to the outlet of the head, said nozzle member and said diffuser being non-removable from the head.

17. A torch as set forth in claim 16 wherein said diffuser is press fit into the diffuser passage and attached to the head by a soldered connection with the head.

18. A torch as set forth in claim 16 wherein said nozzle member is attached to the head by a soldered connection with the head.

* * * * *